(No Model.)
C. B. FERRELL.
PLANTER.
No. 354,405. Patented Dec. 14, 1886.
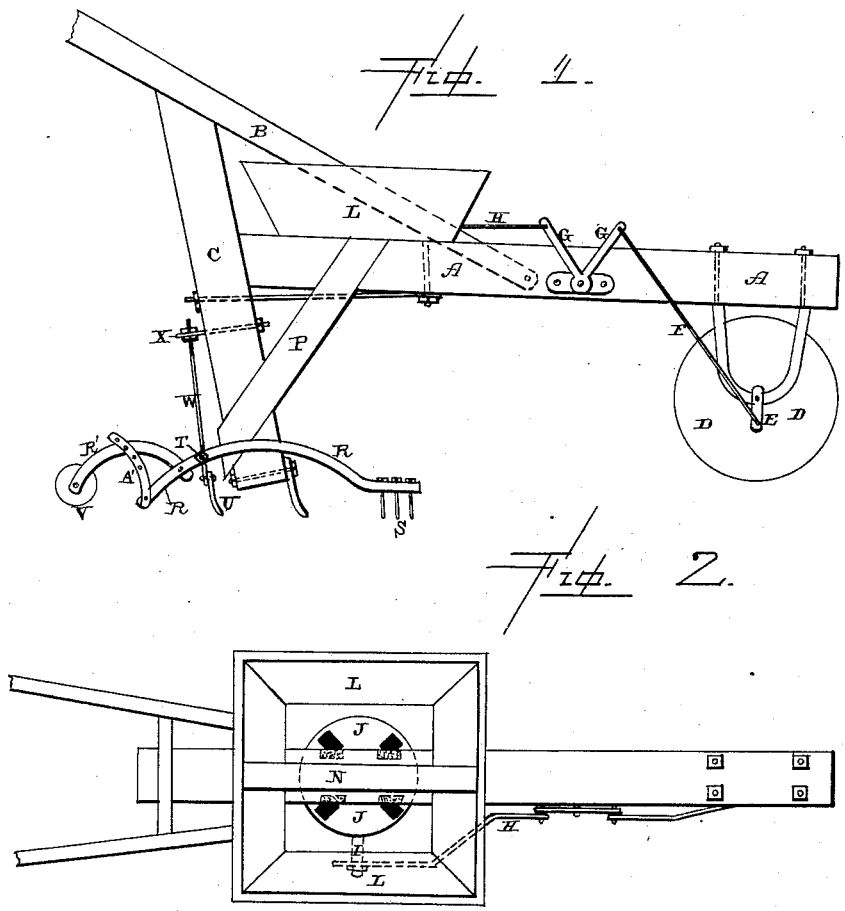
Witnesses.
L. F. Gardner
L. L. Burket
Inventor
C. B. Ferrell,
per F. A. Lehmann,
Atty

UNITED STATES PATENT OFFICE.

CHARLES BAILEY FERRELL, OF LINDEN, WEST VIRGINIA.

PLANTER.

SPECIFICATION forming part of Letters Patent No. 354,405, dated December 14, 1886.

Application filed September 30, 1886. Serial No. 214,957. (No model.)

*To all whom it may concern:*

Be it known that I, CHARLES BAILEY FERRELL, of Linden, in the county of Roane and State of West Virginia, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters; and it consists in the combination, with the furrow-opener, of a rake, which is placed in front of the shovel both for the purpose of raking the ground in front of it and regulating the depth it shall run, the covering-plows, which are connected to the same lever as the rake-teeth, and a mechanism for raising and lowering the covering-plows and the rake, whereby the seed may be planted either shallow or deep, as desired, all of which will be more fully described hereinafter.

The object of my invention is to provide a planter by means of which corn and beans may be planted at the same time, and either in the same or alternate hills, and the seed covered to any desired depth.

Figure 1 is a side elevation of a planter embodying my invention. Fig. 2 is a plan view of the same.

A represents the beam, B the handles, C the standard, and D the supporting-wheel under the front end of the beam. This wheel is provided with a suitable crank, E, to which is connected the rod F. This rod is connected at its upper end to the crank-lever G, which is pivoted upon the side of the beam. To the other arm of the lever from the one to which the rod F is connected is fastened a second connecting-rod, H, which rod at its rear end is fastened to an arm, I, which projects out from the semi-rotating valve J in the bottom of the hopper L. A strip of suitable width extends across the top of the valve for the purpose of acting as a cut-off to the four holes or cups that are made through the valve. The seed-box is divided by the vertical partition N into two compartments, one of which is to receive corn and the other beans, or any other similar seed. In the edge of the strip which extends across the top of the valve are placed brushes, which serve to clean away unnecessary seed as the valve rotates. By stopping up one of the holes in the valve in each compartment the distance between the hills is doubled. By stopping up one of the holes in the corn-division and allowing both of the holes in the valve of the bean-division to remain open, two hills of beans will be planted to every one of corn.

The seed-spout P extends down from the under side of the hopper directly to the rear of the standard C, to which the furrow-opener is secured. Pivoted to the side of the standard is the bar or frame R, which extends both in front and to the rear of the standard, and which has a suitable number of harrow-teeth, S, fastened to its front end. These teeth S are arranged in a semicircle, and serve not only to brush away sticks, stones, and other obstructions which may be in front of the furrow-opener, but by pressing upon the ground act as a lever to prevent the furrow-opener from running below a certain depth. Passing through the rear end of this rod or lever R is a horizontal rod, T, upon which the two covering-plows U are placed. One of these plows is placed at each end of the rod and is held in position by means of suitable set-screws. Journaled in the rear end of the rod R' is a roller, V, which serves to roll the seeds as rapidly as they are covered. This rod R, carrying the harrow in front, and the covering devices U and roller V in the rear of the furrow-opener, is made vertically adjustable by means of the rod W, which passes at its upper end through a rod, X, which passes through the standard C. Upon the upper end of this rod W is formed a screw-thread and adjusting-nuts, which are placed upon its threaded end on opposite sides of the rod X. By adjusting this rod W vertically, the harrow-teeth S in front can be forced downward, so as to prevent the furrow-opener from running beyond a certain depth, and then the covering devices U are raised upward at the same time, so as to cover the seeds which have been dropped more lightly. By means of the pivoted bar R and adjusting devices both the depth of the furrow and the depth to which the seed shall be planted are regulated at will.

Secured to the top edges at the rear ends of the rods R are the perforated rods or bearings A', through which is passed a rod or journal, upon which the roller is placed. This roller is made vertically adjustable in the openings in these perforated rods or bearings A' for the purpose of giving a more complete and permanent regulation in the different depths that the furrow-opener and covering-plow shall run than is provided by simply raising or lowering the rods R by means of the rod W. By means of these bearings A' a roller can be adjusted independently of the rake or harrow. By lowering or raising the harrow, as may be desired, the roller rolls the seed and acts as a wheel in conjunction with the driving-wheel. Both of the wheels run upon the soil and only allow the plow to run as deep as the bottom of the plow projects below the level of the two wheels.

Having thus described my invention, I claim—

1. In a seed-planter, the combination of a dropping mechanism, the spout P, the standard C, provided with a furrow-opener, with a pivoted rod, R, provided with rake-teeth S at its front end, the covering devices U, connected thereto in the rear of the furrow-opener, the rods W Z, and adjustable nuts, substantially as specified.

2. The combination of the standard, the pivoted rod R, having the bearings A' formed upon its rear end, and the roller which is vertically adjustable in the bearings, substantially as set forth.

In testimony whereof I affix my signature in presence of two witnesses.

CHARLES BAILEY FERRELL.

Witnesses:
J. H. BAYS,
E. W. ADAMS.